United States Patent
Price et al.

(10) Patent No.: US 12,095,403 B2
(45) Date of Patent: Sep. 17, 2024

(54) DIRECT DRIVE SYSTEM FOR BRUSHLESS DC (BLDC) MOTOR

(71) Applicant: IRP NEXUS GROUP LTD, Nes Ziona (IL)

(72) Inventors: Paul Price, Nes-Ziona (IL); Shmuel Ben Yaakov, Tel Yitzhak (IL)

(73) Assignee: IRP NEXUS GROUP LTD., Nes Ziona (IL)

( * ) Notice: Subject to any disclaimer, the term of this patent is extended or adjusted under 35 U.S.C. 154(b) by 0 days.

(21) Appl. No.: 18/014,410

(22) PCT Filed: Jul. 6, 2021

(86) PCT No.: PCT/IL2021/050828
§ 371 (c)(1),
(2) Date: Jan. 4, 2023

(87) PCT Pub. No.: WO2022/009201
PCT Pub. Date: Jan. 13, 2022

(65) Prior Publication Data
US 2023/0283210 A1    Sep. 7, 2023

(30) Foreign Application Priority Data
Jul. 6, 2020 (IL) .......................... 275886

(51) Int. Cl.
*H02P 6/15*     (2016.01)
*H02P 6/08*     (2016.01)
(Continued)

(52) U.S. Cl.
CPC .............. *H02P 6/182* (2013.01); *H02P 6/085* (2013.01); *H02P 27/085* (2013.01)

(58) Field of Classification Search
CPC ......... H02P 6/085; H02P 6/182; H02P 27/085
(Continued)

(56) References Cited

U.S. PATENT DOCUMENTS

| | | | | |
|---|---|---|---|---|
| 4,005,348 A | * | 1/1977 | Niimi ..................... | H02P 7/29 318/373 |
| 2002/0175644 A1 | * | 11/2002 | Su ........................ | H02M 7/483 318/400.23 |
| 2018/0198401 A1 | * | 7/2018 | Thongam ................ | B60L 7/14 |

FOREIGN PATENT DOCUMENTS

| KR | 10-2016-0007763 A | 1/2016 |
|---|---|---|
| WO | 2021/124326 A1 | 6/2021 |

OTHER PUBLICATIONS

Fang, Jiancheng et al. "Torque Ripple Reduction in BLDC Torque Motor With Nonideal Back EMF." IEEE Transactions on Power Electronics 27(11):4630-4637 (Year: 2012).

(Continued)

*Primary Examiner* — Gabriel Agared
(74) *Attorney, Agent, or Firm* — Saliwanchik, Lloyd & Eisenschenk

(57) ABSTRACT

Circuitry for directly providing drive power to a BLDC motor having separated coils, comprising unipolar controlled current sources for supplying current to each of the separated coils; a controller, for controlling the level and phase of the unipolar controlled current sources; a polarity switch for converting the unipolar current to a bipolar (AC) current, supplied to the separated coils. The controller is adapted to shape the current being fed to the BLDC motor by the current source via the polarity switch, to be in phase with the back EMF sensed on the separated coils, and of a magnitude that corresponds to a required torque.

16 Claims, 9 Drawing Sheets

(51) Int. Cl.
  *H02P 6/182* (2016.01)
  *H02P 27/08* (2006.01)
  *H02P 27/14* (2006.01)
(58) Field of Classification Search
  USPC .................................................. 318/400.34
  See application file for complete search history.

(56) References Cited

OTHER PUBLICATIONS

Lianbing, Li et al. "Study on Torque Ripple Attenuation for BLDCM Based on Vector Control Method." 2009 Second International Conference on Intelligent Networks and Intelligent Systems pp. 605-608 (Year: 2009).

* cited by examiner

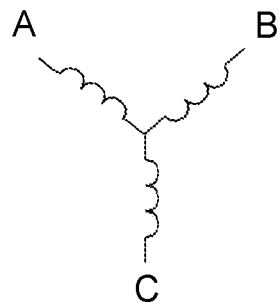
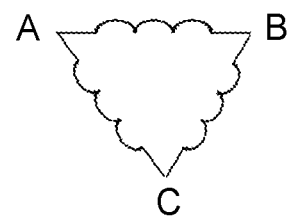
Fig. 3a (prior art)    Fig. 3b (prior art)
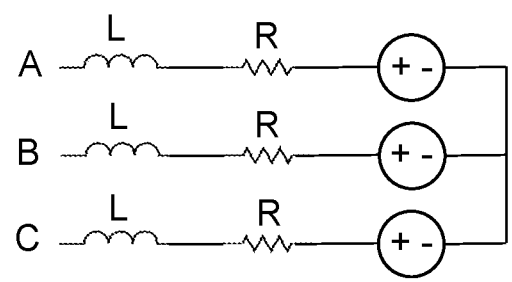
Fig. 4 (prior art)
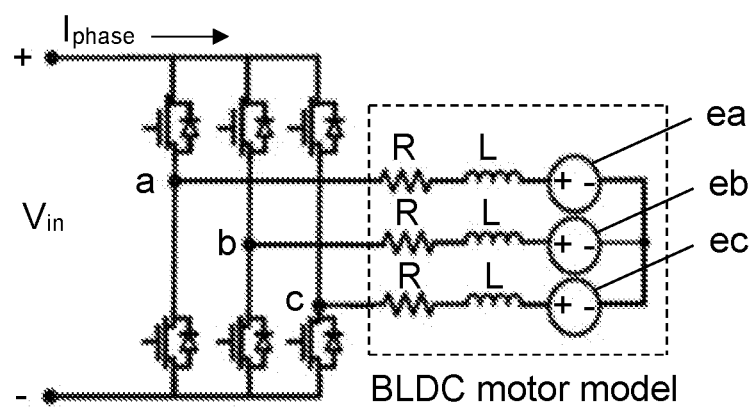
Fig. 5 (prior art)

From Control    From Control

DIRECT DRIVE SYSTEM FOR BRUSHLESS DC (BLDC) MOTOR

CROSS REFERENCE TO RELATED APPLICATIONS

This application is a National Stage Application of International Application Number PCT/IL2021/050828, filed Jul. 6, 2021; which claims priority to Israel Patent Application No. 275886, filed on Jul. 6, 2020, both of which are incorporated herein in their entirety.

FIELD OF THE INVENTION

The present invention relates to the field of DC motor drive systems. More particularly, the invention relates to a method and circuitry for performing efficient bidirectional power transfer and accurate phase correction of DC motor drives.

BACKGROUND OF THE INVENTION

In brushless motors there is a permanent magnet which is a part of the rotor and surrounding several coils which are a part of the stator. When a coil is activated, the generated magnetic field attracts/detracts some of the poles of the rotor magnets in order to start and maintain rotation. Then the next coil is activated and so on. FIG. 1 (prior art) shows a motor in which the permanent magnets are in the center, surrounded by several coils that function as controlled electromagnets. FIG. 2 (prior art) shows a motor in which several coils that function as controlled electromagnets the permanent magnets are in the center, surrounded by permanent magnets.

FIGS. 3a and 3b show star and delta motor topology, respectively. Most of the motors are implemented in star topology, which has less power losses than the delta configuration which may have a parasitic circulating current. Generally, the model of a motor can be illustrated by a star connection of three equivalent circuits, each of which consisting of a serial connection of an inductor L, a resistor R and a voltage source representing the electromotive force (EMF) generated when the inductor passes (via rotation) a permanent magnet, as shown in FIG. 4. The magnitude of the EMF depends on the rotation velocity of the rotor. Therefore, increasing the applied voltage (at points A, B and C) increases the rotor's rotation velocity.

FIG. 5 (prior art) shows a typical motor drive circuit using an inverter that generates the required voltages (A, B and C) and phase differences. The disadvantage of this approach is that the maximum back EMF, and hence the motor speed, is always substantially lower than the input voltage Vin (see FIG. 5) when the current is in phase with the back EMF (see FIG. 6) as required for maximum efficiency. Consequently, when high motor speeds are required, that is high back EMF, there is a need to implement Field Weakening Control, which is known in the art to cause high power losses and hence lower efficiency due to the generation of high reactive currents.

A possible remedy to the shortcoming of the conventional star connection approach at high motor speed, pointed above, is to use separated coils, as depicted in FIG. 7. In this case, a much higher back EMF can be accommodated by the inverter as compared to the classical star connection (see FIG. 5), in which the inverter feeds two coils in series, while in the separated coils case, the inverters can feed each coil with the full available voltage. However, a disadvantage of this approach is that it requires a double number of switched (three full bridges), as compared to the conventional three-phase inverter (see FIG. 5). It is therefore an object of the present invention to provide a method and circuitry for an efficient motor drive and phase correction of motor drives, which is more efficient at high motor speeds than prior art methods.

It is another object of the present invention to provide a method and circuitry for an efficient motor drive, in which the current exactly match the shape of the back EMF.

Other objects and advantages of the invention will become apparent as the description proceeds.

SUMMARY OF THE INVENTION

A Method for directly providing drive power to a BLDC motor, comprising:
  a) providing a BLDC motor having separate coils;
  b) providing unipolar controlled current sources for each of the separated coils;
  c) providing a controller for controlling the level and phase of the unipolar controlled current sources;
  d) providing a polarity switch to convert the unipolar current to a bipolar (AC) current, supplied to the separated coils, and to allow bidirectional operation.

The controller is adapted to shape the current that is fed to the motor by the current source via the polarity switch, to be in phase with the back EMF sensed on the separated coils, and of a magnitude that corresponds to a required torque.

The controller may be provided with a data file, an equation, or a look up table, which represent the back EMF value of the particular motor, for controlling the current passing through the separated coils.

The method may further comprise the steps of:
  a) providing a BLDC motor having separated coils;
  b) providing a controller for controlling the level and phase of input voltages supplied to the separated coils;
  c) providing a controlled inverter with outputs, for applying phase-separated input voltages to each of the separated coils at desired timing for each input voltage, determined by the controller;
  d) providing a power source for feeding power to the controlled inverter;
for each separated coil:
  e) providing a control unit with a data file, an equation, or a look up table, which represents the back EMF value of the particular motor, for controlling the current passing through the separated coil;
  f) providing a controlled current source that produces unipolar current passing through the source, according to a command signal for the separated coil from the control unit, to generate unipolar current that fulfills a predetermined requirement;
  g) providing a polarity switch for causing the current of the controlled current source to flow in one direction when the back EMF is positive, and in other direction when the back EMF is positive;
  h) measuring the current of the coil;
  i) measuring the rotor position φ of the motor and obtaining the corresponding back EMF from the look-up table;
the each control unit is adapted to:
  j) calculate at any given position, the required current that corresponds to the back EMF;
  k) force the drive of the corresponding coil by applying a command signal to the controlled current source, such that the current produced by the current source will meet the back EMF exactly with the same magnitude, the same shape and the same position.

The back EMF of the motor may be measured by rotating the rotor externally and measuring the voltage of one coil for each rotor position, thereby mapping the back EMF of the motor.

The back EMF of the motor may be obtained by simulation of the voltage that the coil sees as a function of the degrees of rotation of the rotor.

The required current shape for each measured position may be taken from the look-up-table.

The magnitude of the current may be determined by the required power, while keeping the shape of the current will be the same.

The polarity switch may be located before or after the coil.

The method may further comprise the steps of:
a) using a feedback signal which measures the current in the coil; and
b) forcing the current to be the required current for achieving an optimal operation, according to the feedback signal.

A half-bridge may be used, which operates at very high frequency and a low pass filter for filtering the transition of the switches of the half-bridge and feeding a smooth current to the coil.

The transistors implementing the polarity switch may operate at very low frequency.

The two half bridges may be implemented using a multilevel configuration, in which the switches are connected to a capacitor C, where the voltage across the capacitor is half of the voltage.

Whenever there is a need for high power, interleaved configuration may be used by connecting several units in parallel and operate the units in an interleaved configuration.

The polarity switch may be implemented using a half-bridge or a full bridge.

The controlled current source may be implemented using a half-bridge or a full bridge.

The interleaved configuration may be a multiphase interleaved configuration or a multilevel interleaved configuration.

A low pass filter may be used to filter high transition in the half-bridge, such that the voltage across the capacitor of the low pass filter has a lower voltage transition dV/dt.

Circuitry for directly providing drive power to a BLDC motor having separated coils, comprising:
a) unipolar controlled current sources for supplying current to each of the separated coils;
b) a controller, for controlling the level and phase of the unipolar controlled current sources; and
c) a polarity switch for converting the unipolar current to a bipolar (AC) current, supplied to the separated coils.

The controller may be adapted to shape the current being fed to the BLDC motor by the current source via the polarity switch, to be in phase with the back EMF sensed on the separated coils, and of a magnitude that corresponds to a required torque.

The circuitry may comprise:
a) a controller for controlling the level and phase of input voltages supplied to the separated coils;
b) a controlled inverter with outputs, for applying phase-separated input voltages to each of the separated coils at desired timing for each input voltage, determined by the controller;
c) a power source for feeding power to the controlled inverter;

wherein each separated coil has:
d) a control unit with a data file, an equation, or a look up table, which represents the back EMF value of the particular motor, for controlling the current passing through the separated coil;
e) a controlled current source that produces unipolar current passing through the source, according to a command signal for the separated coil from the control unit, to generate unipolar current that fulfills a predetermined requirement;
f) a polarity switch for causing the current of the controlled current source to flow in one direction when the back EMF is positive, and in other direction when the back EMF is negative,
g) measuring the current of the coil; and
h) measuring the rotor position φ of the motor and obtaining the corresponding back EMF from the look-up table.

Each control unit may be adapted to:
a) calculate at any given position, the required current that corresponds to the back EMF;
b) force the drive of the corresponding coil by applying a command signal to the controlled current source, such that the current produced by the current source will meet the back EMF exactly with the same magnitude, the same shape and the same position.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIGS. 3a and 3b (prior art) show star and triangular motor topology, respectively;

FIG. 4 (prior art) shows a model of a motor can be illustrated by a star connection;

FIG. 5 (prior art) shows a typical control circuit using an inverter that generates the requires voltages and phase differences;

DETAILED DESCRIPTION OF THE PRESENT INVENTION

FIG. 5 (prior art) shows the classical method of driving a BLDC motor in which a three-phase inverter, controlled by Pulse Width Modulation (PWM), generates an AC voltage that is fed to the star-connected motor's coils.

Figure 6:
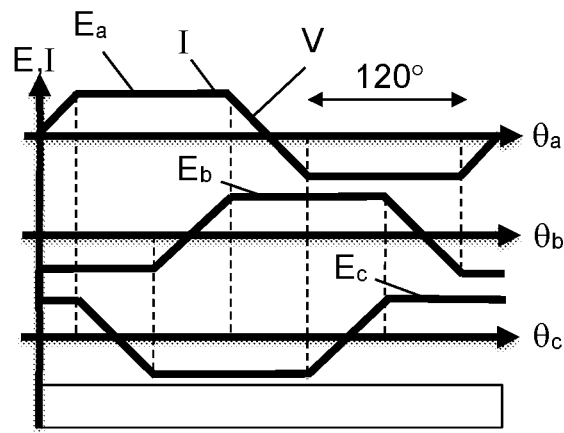
FIG. 6 (prior art) shows an ideal case, in which the current and the voltage coincide with each other, such that their form is exactly the same.

FIG. 6 (prior art) shows an ideal case, in which the current and the voltage coincide with each other, such that their form is exactly the same. In this case, there is prefect correlation (overlap) between the voltage and the current, so there is no situation where the current is not correlated with voltage and not contributing to the real power.

Therefore, if the shape of the back EMF will be different, it is desired that the current will be different, as well.

Figure 7:
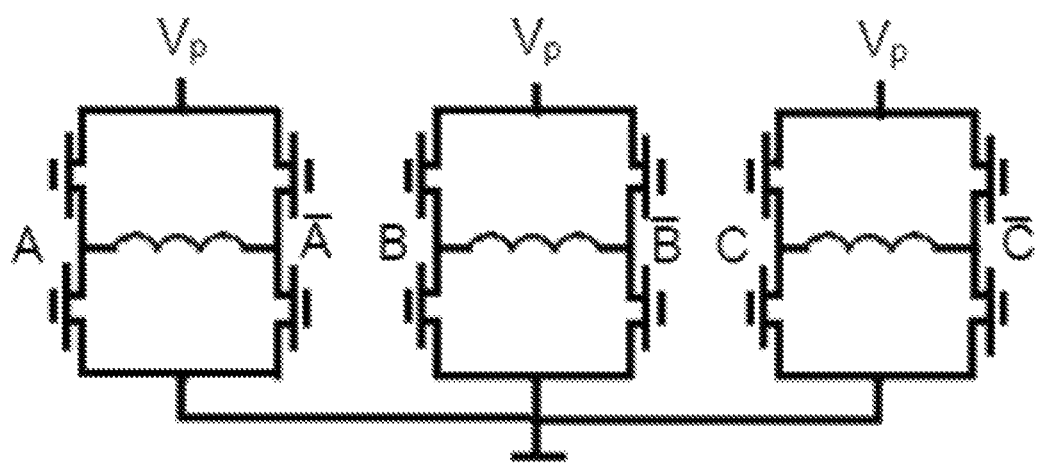
FIG. 7 (prior art) shows a case of using separated coils, which have the advantage that there is a better way of controlling them.

FIG. 7 (prior art) shows a case of using separated coils, which have the advantage that there is a better way of controlling them. With separated coils, it is possible to have higher speed, because for a given DC voltage, an equivalent higher voltage can be imposed on the coils. In a star connection, for example, there are two branches in series. In contrast, by using separated coils, each branch (each coil) is driven by itself, so it has an advantage. However, in prior art approach, this method of separated coils requires a double number of switches, operating at high switching frequency, (three full bridges) as compared to the conventional three-phase inverter (see FIG. 5).

Figure 8:
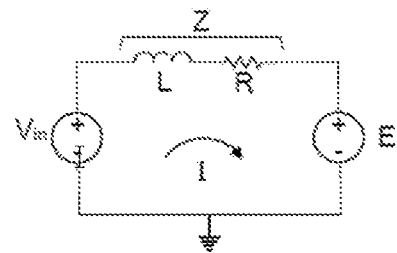
FIG. 8 (prior art) shows that for an equivalent circuit for a separated coil.

FIG. 8 (prior art) shows that for a separated coil, the equivalent circuit is a back EMF (E) on the right, the impedance Z at the center and the equivalent input Vin that is being generated by the inverter on the left. It can be seen that in order to operate optimally, the current should be shaped such that it will exactly correspond the shape of the back EMF. However, the fact that there is an impedance Z between $V_{in}$ and E entails that the voltage $V_{in}$ will not be exactly equal to the back EMF, but must be different. The difference should be adjusted such that the end result will be a current which accurately corresponds to the back EMF.

Figure 9:
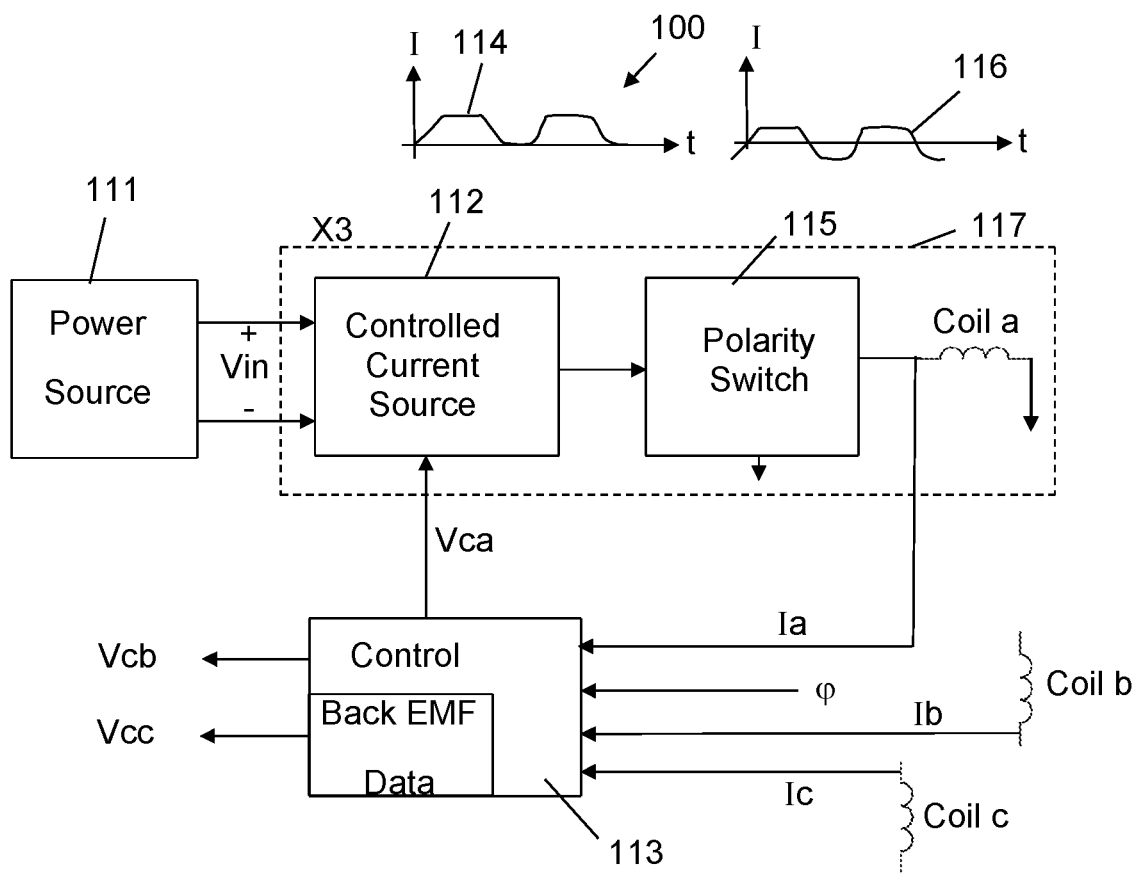
FIG. 9 shows a block diagram of the direct-drive system, according to an embodiment of the present invention.

FIG. 9 shows a block diagram of the direct-drive system 100, according to an embodiment of the present invention. The system feeds a BLDC motor with separated coils (A, B and C) and includes a controlled power source 111 such as a battery or any other power source (a voltage source) and a unipolar controlled current source 112, for feeding coil A (VCA). The shape and magnitude of the said current is forced by the control unit 113 (which is used as a controller for controlling the level and phase of the unipolar current sources), so as to generate unipolar current that passes through the current source, according to a command signal from the control unit, for each separated coil, to generate unipolar current that fulfills a given predetermined requirement. The controller shapes the current that is fed to the motor by the current source (via a polarity switch), to be in phase with the back EMF sensed on the separated coils, and of a magnitude that corresponds to a required torque.

This current is unipolar, because the power supply is a DC supply and the current coming out of the DC supply has to be in one direction. For example, if the power source is positive in the upper terminal, the current has to go out from this terminal all the time, because positive power is required. Therefore, the current that this controller produces is always positive, as shown in plot 114 (which has a positive profile all the time).

On the other hand, the motor produces back-EMF voltages which are positive and negative, so there is a need to match the current to the polarity of the motor (of the back EMF of the motor which is positive and negative). A polarity switch 115 is used for this purpose, such that when the back EMF is positive, the polarity switch 115 causes the current to flow in one direction, and when the back EMF is negative, the polarity switch 115 causes the current to flow in other direction, so the power is always positive. The polarity switch and the controlled current source can be implemented using a half-bridge or a full bridge.

Since the power is the product of the current times the voltage, if the voltage is positive, the current has to be positive, and if the voltage is negative the current has to be negative (because it is an AC drive). Plot 116 shows the current through one coil (coil A). In this example, subsystem 117a (consisting of controlled power source 111 and polarity switch 115) is required for coil A. Likewise, similar subsystem 117b and 117c are also required for coils B and C, respectively.

In order to achieve the desired result, there is a need of the following:
the current $I_a$ of the coil A should be measured or alternatively the current after the controlled current source is measured. It is basically the same current, except that the controlled current source 111 is only positive (DC), while the coil current is after the reversal by the polarity switch. Hence the coil current is positive or negative (AC), such that the measured current is always the current of the coil.
the position of the motor (marked by φ) should be measured, and the back EMF controller receives information from the other coils, $I_b$ and $I_c$.

The control unit 113 includes at least a data file, an equation, or a look up table, file or a look up table, which represent the back EMF value of this particular motor. The data is used for controlling the current passing through the separated coils. This back EMF value can be either first measured for this type of motor by rotating the rotor externally and measuring the voltage of one coil. This measurement represents the back EMF since there is no current flowing (it is an open circuit). It is possible to rotate the motor by an external mechanism and measure the voltage of the coil. This rotation allows mapping the back EMF of the motor.

Alternatively, this could be done by simulation, by designing the motor. One of the steps of the design that one can get by simulation is the back EMF, which is the voltage that the coil sees, as the function of the phase angle (the position) of the rotor. This is the voltage that the coil sees as a function of the degrees of rotation of the rotor. These are the trapezoidal type of curve that was shown in FIG. 6 above.

Yet another method to obtain the EMF versus rotor position table is to measure the coil voltage with at least one open terminal on the run. This is done by disconnecting at least one of its terminal and measuring the open-circuit voltage of the coil when the motor is in operation.

By knowing the position of the rotor, it is thus possible to obtain the corresponding back EMF by the lookup table. Knowing the position of the rotor, and hence the momentary value of the back EMF, it is possible to calculate at any given point, what is the required current in order to make sure that it corresponds to the back EMF. That is, by knowing the position, the back EMF is also known and therefore, it is possible to force the drive (by applying VCA), such that the current will meet the back EMF exactly the same magnitude, the same shape and the same position.

This is process is done automatically and continuously for each coils: the position φ is measured, the required current shape for the measured position is taken from the look-up-table or calculated by a curve fitted equation. While the phase angle of current depends on the position of the rotor, the magnitude depends on the required torque: If there is a need for a higher torque, the shape of the current will be the same but the magnitude will be higher. Then, for each given position, it is possible to calculate what must the drive signal be, such that the current will match the back EMF. The same process is simultaneously performed for the remaining coils B and C. The magnitude of the current is determined by the required power, while keeping the shape of the current to be the same.

As would be clear to a person skilled in the art, the control method of this invention is applicable both to the case when the motor is acceleration or continuously running, as well as to the case when the motor is deceleration, that is in the breaking situation. In the latter case, the direction of the current will be reversed and hence, the power will be returned to the source.

Figure 10:
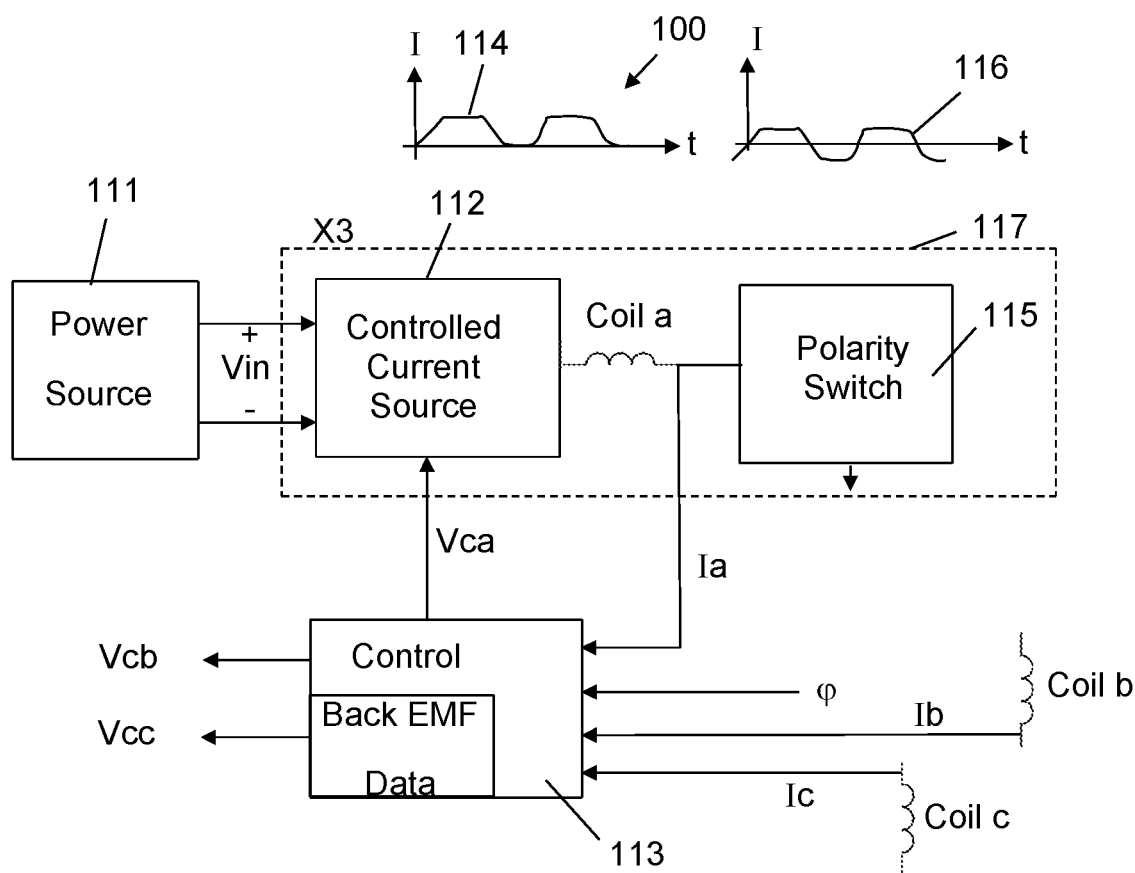
FIG. 10 shows another embodiment of the present invention, where the polarity switch is located on the other side of the coil.

FIG. 10 shows another embodiment of the present invention, which is very similar to the embodiment of FIG. 9, except that the polarity switch 115 is located on the other side of the coil A. In this case, the polarity reversal is accomplished by Q3 and Q4 (FIG. 11) that form a half-bridge. When Q4 is turned on, the current will flow from left to right. When Q3 is turned on, current will flow from the source Vin to the coil, namely from right to left.

The advantage of the switch reversal embodiment of FIG. 11 is that it requires only two switched for the polarity switching. In contrast, a conventional polarity switch as indicated in FIG. 10 will require a full bridge, namely 4 switches.

The advantage of the present invention over the prior art is that in the present invention, it is possible to exactly match the current to the shape of the back EMF. The back EMF can be in different shapes like a trapezoidal shape, a triangular shape, etc.

By knowing what is exactly the back EMF as a function of the angle φ of the rotor of a particular motor type (due to the mapping that was performed for this type) as a function of the position φ of the motor. So now, it is possible to generate a current which is exactly at the required shape, at the required time and at the required position, by using the back EMF data, by the present position φ and by a feedback signal $I_A$ which measures the current in coil A and using feedback signal $I_A$ to forcing the current to be the required current for achieving an optimal operation. The rotor position φ of the motor is measured and the corresponding back EMF is obtained from said look-up table.

The back EMF of the motor is measured by rotating the rotor externally and measuring the voltage of one coil for each rotor position. By doing so, the back EMF of the motor is mapped.

Each control unit calculates at any given position, the required current that corresponds to said back EMF and forces the drive of the corresponding coil by applying a command signal to the controlled current source, such that the current produced by the current source will meet the back EMF exactly with the same magnitude, the same shape and the same position.

Therefore, the advantage of the present invention is that the current is being shaped according to the particular back EMF. Similarly, the control units 112 of coils B and C provide the required drive commands $V_{CB}$ and $V_{CC}$ to the controlled current sources 112 of coils B and C, respectively.

In order to drive a motor with three separated coils, three full-bridge inverters are required. The conventional way of using three inverters or a three-phase inverter is to run it in PWM at a given frequency. The losses are a function of the resistance in the circuit and also due to the switching losses of the inverter. If the modulation is performed in a higher frequency, the switching losses will be higher. Generally, it is required to modulate in high frequency because at low frequency (e.g., modulation at 1 KHz) the waveform will have unacceptable ripple. Therefore, in order to have a low ripple, there is a need to modulate at high frequency. An advantage of this invention when implemented with a half-bridge polarity reversal, is that the phase reversal half-bridge is required to operate at low frequency, corresponding to the motor's electrical frequency which is much lower than the PWM modulation frequency. Consequently simpler and lower cost switches can be used in the implementation of the half-bridge phase reversal circuit.

A controlled inverter (with outputs), fed by a power source, is used for applying phase-separated input voltages to each of the separate coils, at desired timing for each input voltage, that is determined by the controller.

Nowadays there are switches for high frequency, however, there is another problem that the motor itself can be harmed when exposed to very high voltage transitions (high dV/dt), because high voltage transitions can cause corona and voltage breakdowns of the coils' windings and hence will shorten the motor life.

There are several problems with the conventional drive. Even though Silicon Carbide (SiC) or Gallium Nitride (GaN) switches can operate at high frequency, they cannot be used conveniently, since there produce very fast voltage transitions (high dV/dt) and hence, may damage the motor due to corona build up and breakdowns.

Figure 11A:
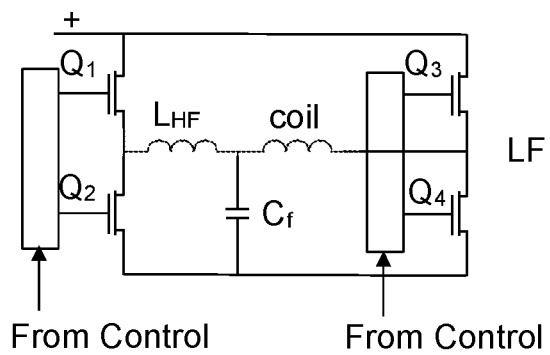
FIGS. 11A-11E show an implementation of the drive system, according to an embodiment of the present invention the present invention.

FIGS. 11A-13E show an implementation of the drive system, according to an embodiment of the present invention the present invention. FIG. 11A shows a basic implementation, where $Q_1$ and $Q_2$ are half a bridge, which operates at very high frequency. A low pass filter represented by $L_f$ and $C_f$ is used to filter the very high transition of $Q_1$ and $Q_2$, such that the voltage across the capacitor $C_f$ has a lower voltage transition (lower dV/dt). The advantage is that the half-bridge can operate at a high frequency, without subjecting the motor's coils windings to high dv/dt. The filter can be small, because the higher the frequency is, the inductance of the coil and the capacitance of the capacitor of the filter become smaller and smaller. The breakpoint could be higher and therefore, there is a need for lower inductance and capacitance. The low pass filter filters the transition of the switches of the half-bridge and feeds a smooth current to the coil, such that the voltage across the capacitor of the low pass filter has a lower voltage transition dV/dt.

Figure 11B:
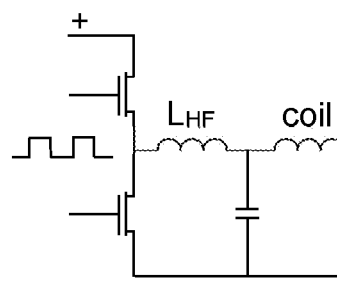

The polarity of the filtered current fed to the motor's coil is controlled by $Q_3$ and $Q_4$ which are used to implement the polarity switch 115. FIG. 11B shows the equivalent circuit when $Q_4$ is turned on (conducting), and $Q_3$ is turned off (non-conducting). In this situation, the motor's coil is actually connected to ground on one side. As $Q_1$ and $Q_2$ are being switched, it is possible to control the voltage while the current is flowing from the modulator to ground, as depicted in FIG. 11C.

This is because the voltage Vin of the battery (power source) is positive with respect to ground (it is connected to the ground in one side), so the voltage generated by the modulation is positive with respect to ground, and therefore, the current direction will be from the left to the right.

Figure 1:
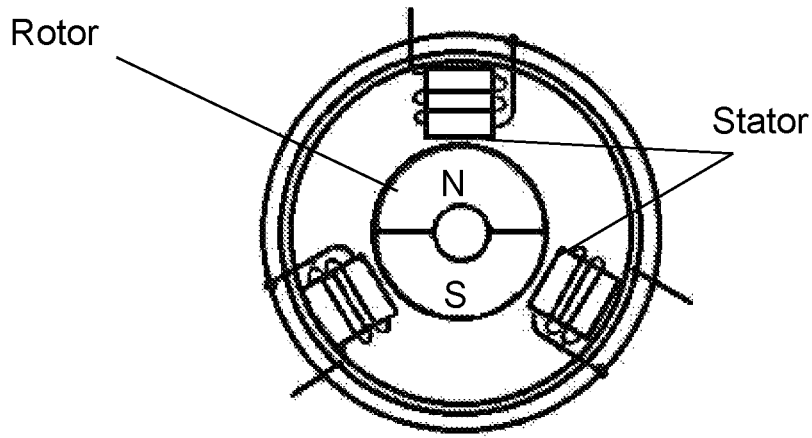
FIG. 1 (prior art) shows a motor with three poles, in which the permanent magnets are in the center, surrounded by several coils that function as controlled electromagnets.
Figure 2:
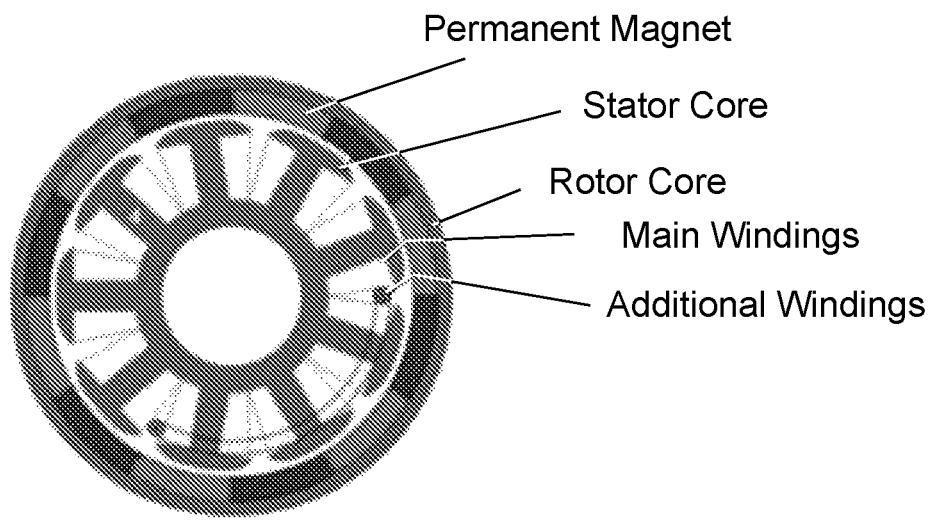
FIG. 2 (prior art) shows a motor in which several coils that function as controlled electromagnets the permanent magnets are in the center, surrounded by permanent magnets.
Figure 11D:
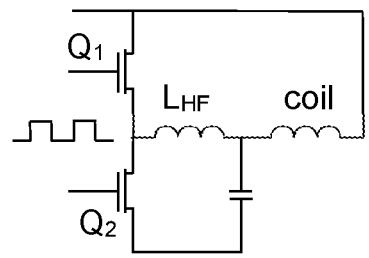
Figure 11C:
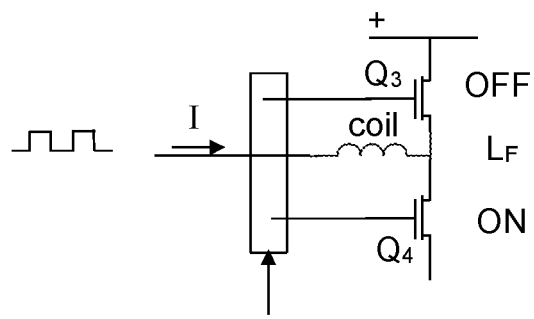
Figure 11E:
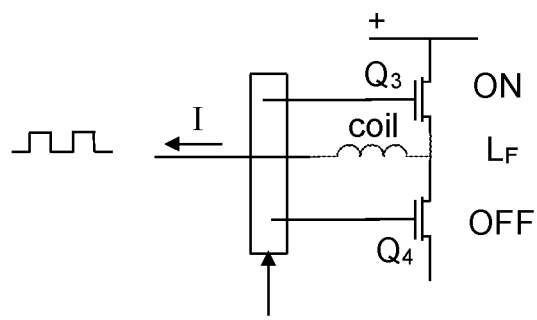

FIG. 11D shows a state where $Q_3$ is turned on (conducting) and $Q_4$ is turned off (non-conducting). In this state, the coil is connected to the positive terminal of the input voltage and hence to the high voltage of system. Therefore, for every switching of $Q_1$ and $Q_2$, and the voltage on the right side of the coil is higher, so the direction of the current will be from the right to the left, as shown in the graph of FIG. 1E. This implements the polarity switch.

The advantage of this implementation is the possibility to use high frequency modulation (switching) and utilizing high frequency transistors to generate current in the required shape and magnitude, such that the coil receives only the low frequency component of the current. Then Q3 and Q4 operate at relatively low frequency, because they are just for the electrical frequency of the motor. For example, a motor that runs in a 1000 Revolutions per Minute (RPM). The frequency is about 16 Hz per second, depending on the number of poles, the electrical frequency can be higher, because it there are more poles, there is a need for more cycles per revolution of the electrical drive. For example, if there are 5 or 8 poles, the frequency will be hundreds of Hz. In this case the motor receives current at low frequency, comparing to the very high frequency of the switching of $Q_1$ and $Q_2$, which can be 100 KHz.

In this case, $Q_3$ and $Q_4$ can be low frequency transistors, like IGBTs, because practically, there are no switching losses (because the switching is in a very low frequency). This configuration allows saving the switching losses of $Q_3$ and $Q_4$, using $Q_1$ and $Q_2$ for high frequency only with transistors compatible and suitable for high frequency. This way, the motor is not exposed to unwanted high voltage transitions and high frequency components, which cause losses and may damage the motor, if exposed to square wave voltage at high frequency.

Although the above description of the operation of the drive system according to this invention is related to a am acceleration and constant speed of motor, it holds equally for the case of deceleration (breaking).

Figure 12:
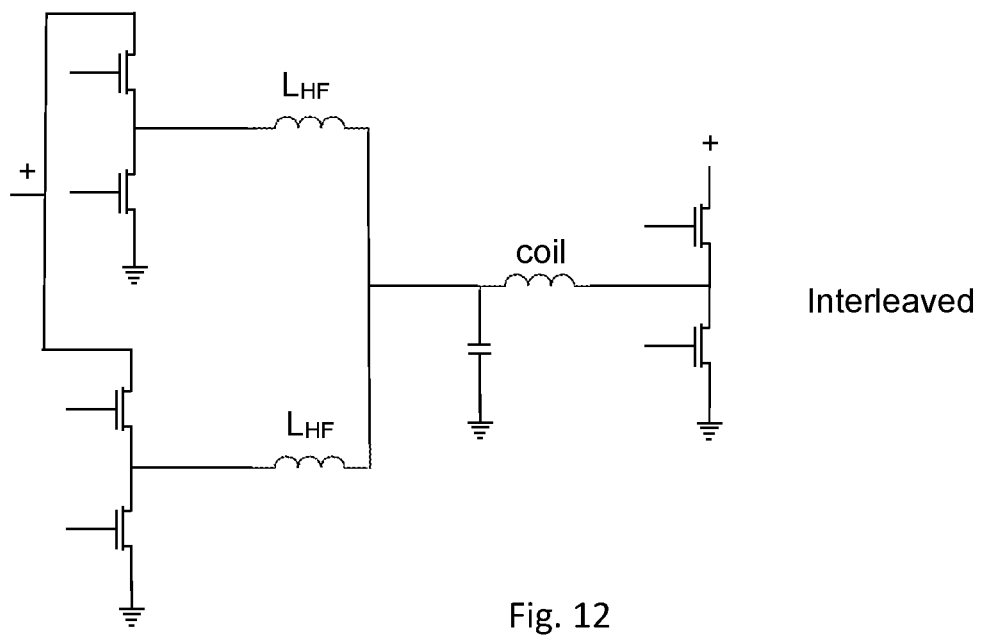
FIG. 12 shows an implementation, according to another embodiment of the invention.
Figure 13A:
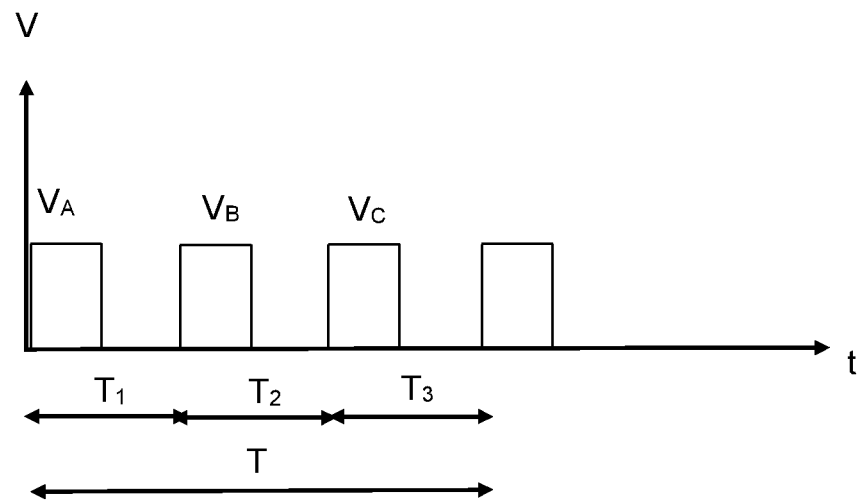
FIGS. 13A and 13B shows several half-bridges connected in parallel, that can be operated in an interleaved mode.
Figure 13B:
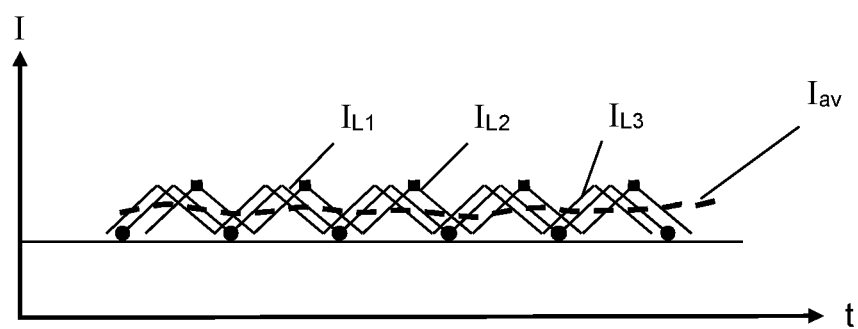

FIG. 12 shows an implementation, according to another embodiment of the invention. In this embodiment, if there is a need for high power, several half-bridges may be connected in parallel, and can be operated in an interleaved mode, as shown in FIGS. 13A and 13B. Each one carries only a part of the current, divided by n, which represents the number of units. The net ripple will be lower, so actually, even smaller inductors can be used.

Each inductor will have a high ripple, but when they are combined, the total ripple becomes lower. So the inductors can be even smaller, and the capacitor can also be small, because it also "sees" high frequency due to the high frequency ripple caused by interleaving.

Figure 14:
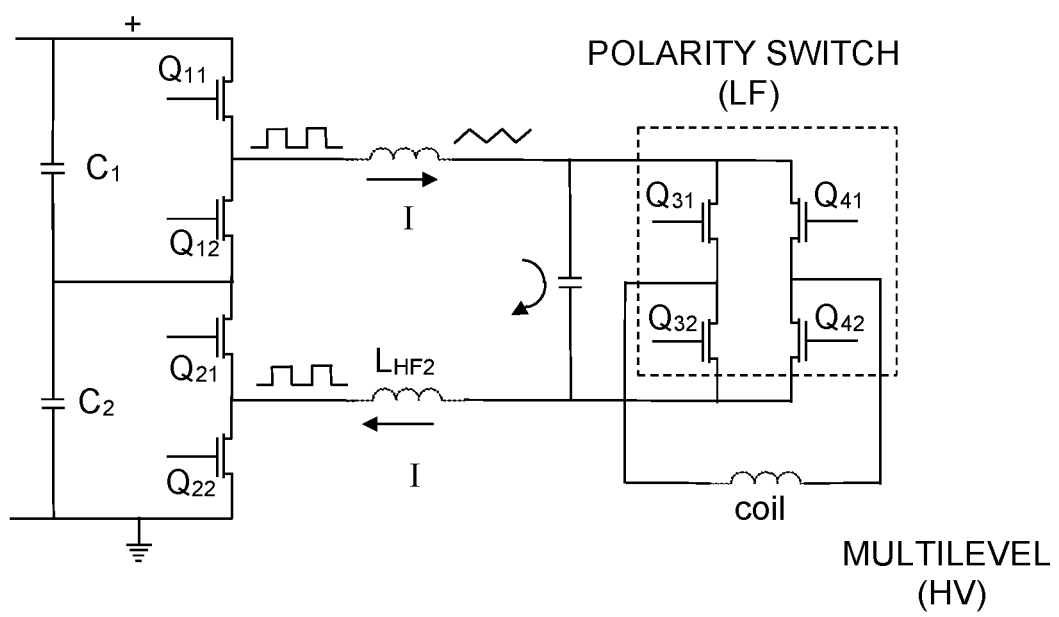
FIG. 14 shows an embodiment with multi-level configuration, in which the switches implement two half bridges.

FIG. 14 shows an embodiment with multi-level configuration, in which switches $Q_{11}$, $Q_{12}$, $Q_{21}$ and $Q_{22}$ implement two half bridges, each of which is connected to a capacitor C. The voltage across C is half of the voltage, so it is possible to have high voltage at the input, using transistors of lower voltage. This is very important, because for example, recent transistors like GaN are limited to operate below approximately 400V.

Since in many applications the power demand increases there is a requirement to go to high battery voltage in order not to have the current too high (or very high). Therefore, for saving power, the current will be lower. The current tendency now is to escalate for example, to high-performance cars with batteries of 800V. In this case, it is not possible to use a GaN transistor. However, in this configuration which is called multi-level configuration, each half-bridge "sees" only half of the voltage. So during switching the circuit operates like a Buck converter (an inductor).

There are two inductors for symmetry and for blocking unwanted Electro-Magnetic Interference (EMI), but in fact, only one inductor is sufficient (since both inductors are connected in series. The upper part of the circuitry of FIG. 14 includes a first Buck converter, and the lower part includes a second Buck converter. The current passes from the upper Buck converter, back into the lower Buck converter. The current coming from the battery is fed into a full bridge implemented by switches $Q_{31}$, $Q_{32}$, $Q_{41}$ and $Q_{42}$, which are also low frequency transistors. The purpose is to switch polarity. The motor can see not just one polarity as the current coming out of the Buck converters, but per the requirement of the back EMF which is positive and negative, $Q_{31}$, $Q_{32}$, $Q_{41}$ and $Q_{42}$ (which are also low frequency) are being switched, such that for each polarity of back EMF, the coil will have the right polarity of the current.

This is an example of the implementation with the polarity switch before the coil, i.e., the polarity switch changes the polarity of coil (the polarity switch is located before or after the coil).

If there is a need for high power, it is possible to use interleaved configuration by connecting several units in parallel, and operate them in an interleaved configuration, such that the entire implementation can be interleaved.

There is no need for interleaved configuration for implementing the polarity switch, because there are no switching losses and there is no problem with low frequency. Interleaved configuration is required and more useful only in the high-frequency part.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for directly providing drive power to a BLDC motor, comprising:
 a) providing a BLDC motor having separated coils;
 b) providing unipolar controlled current sources for each of said separated coils;
 c) providing a controller for controlling the level and phase of said unipolar controlled current sources and for controlling the level and phase of input voltages supplied to said separated coils;
 d) providing a polarity switch to convert said unipolar current to a bipolar (AC) current, supplied to said separated coils;
 e) providing a controlled inverter with outputs, for applying phase-separated input voltages to each of said separated coils at desired timing for each input voltage, determined by said controller;
 f) providing a power source for feeding power to said controlled inverter;
 g) feeding the unipolar controlled current to said polarity switch;
 h) generating a pulsating bipolar voltage by switching said polarity switch; and
 i) feeding said pulsating bipolar voltage to coils of said BLDC motor,
 wherein said controller is adapted to shape the current that is fed to the motor by said current source via said polarity switch, to be in phase with the back EMF sensed on said separated coils, and of a magnitude that corresponds to a required torque, wherein the method further comprises, for each separated coil:

j) providing a control unit with a data file, an equation, or a look up table, which represents the back EMF value of said motor, for controlling the current passing through said separated coil;

k) providing a controlled current source that produces unipolar current passing through said source, according to a command signal for said separated coil from said control unit, to generate unipolar current that fulfills a predetermined requirement;

l) providing a polarity switch for causing the current of said controlled current source to flow in one direction when the back EMF is positive, and in other direction when said back EMF is negative;

m) measuring the current of said coil; and n) measuring a rotor position $\phi$ of said motor and obtaining the corresponding back EMF from said look-up table, and wherein said control unit is adapted to:

o) calculate at any given position, the required current that corresponds to said back EMF; and p) force the drive of the corresponding coil by applying a command signal to said controlled current source, such that the current produced by said current source will meet the back EMF exactly with the same magnitude, the same shape and the same position.

2. The according to claim 1, wherein the back EMF of the motor is obtained by rotating the rotor externally and measuring the voltage of one coil for each rotor position, thereby mapping the back EMF of said motor or by simulation of the voltage that the coil sees as a function of the degrees of rotation of the rotor.

3. The method according to claim 1, wherein the required current shape for each measured position is taken from the look-up-table and the magnitude of the current is determined by the required power, while keeping the shape of the current to be the same.

4. The method according to claim 1, further comprising:

g) using a feedback signal which measures the current in the coil; and r) forcing the current to be the required current for achieving an optimal operation, according to said feedback signal.

5. The method according to claim 1, further comprising using a half bridge, which operates at very high frequency and a low pass filter for filtering the transition of the switches of said half-bridge and feeding a smooth current to the coil.

6. The method according to claim 1, wherein two half bridges are implemented using a multi-level configuration, in which the switches are connected to a capacitor C, where the voltage across said capacitor is half of the voltage.

7. The method according to claim 1, wherein whenever there is a need for high power, using interleaved configuration by connecting several units in parallel and operate said units in an interleaved configuration.

8. The method according to claim 1, wherein the polarity switch and the controlled current source are implemented using a half-bridge or a full bridge.

9. A circuitry for directly providing drive power to a BLDC motor having separated coils, comprising:

a) unipolar controlled current sources for supplying current to each of said separated coils;

b) a controller, for controlling the level and phase of said unipolar controlled current sources, and for controlling the level and phase of input voltages supplied to said separated coils;

c) a controlled inverter with outputs, for applying phase-separated input voltages to each of said separated coils at desired timing for each input voltage, determined by said controller;

d) a power source for feeding power to said controlled inverter; and e) a polarity switch for converting said unipolar current to a bipolar (AC) current, supplied to said separated coils, wherein the unipolar controlled current is fed into said polarity switch to generate a pulsating bipolar voltage by switching said polarity switch and feeding said pulsating bipolar voltage to coils of said BLDC motor, wherein said controller is adapted to shape the current being fed to said BLDC motor by said current source via said polarity switch, to be in phase with the back EMF sensed on said separated coils, and of a magnitude that corresponds to a required torque, wherein each separated coil has:

f) a control unit with a data file, an equation, or a look up table, which represents the back EMF value of said motor, for controlling the current passing through said separated coil;

g) a controlled current source that produces unipolar current passing through said source, according to a command signal for said separated coil from said control unit, to generate unipolar current that fulfills a predetermined requirement; and h) a polarity switch for causing the current of said controlled current source to flow in one direction when the back EMF is positive, and in other direction when said back EMF is negative, wherein each separated coil is adapted to:

i) measure the current of said coil; and j) measure a rotor position $^{SM}$ of said motor and obtaining the corresponding back EMF from said look-up table, and wherein said control unit is adapted to:

k) calculate at any given position, the required current that corresponds to said back EMF; and l) force the drive of the corresponding coil by applying a command signal to said controlled current source, such that the current produced by said current source will meet the back EMF exactly with the same magnitude, the same shape and the same position.

10. The circuitry according to claim 9, wherein the back EMF of the motor is obtained by rotating the rotor externally and measuring the voltage of one coil for each rotor position, thereby mapping the back EMF of said motor or by simulation of the voltage that the coil sees as a function of the degrees of rotation of the rotor.

11. The circuitry according to claim 9, wherein the required current shape for each measured position is taken from the look-up table and the magnitude of the current is determined by the required power, while keeping the shape of the current to be the same.

12. The circuitry according to claim 9, further comprising a half-bridge, which operates at very high frequency and a low pass filter for filtering the transition of the switches of said half-bridge and feeding a smooth current to the coil.

13. The circuitry according to claim 9, wherein the transistors implementing the polarity switch operate at very low frequency.

14. The circuitry according to claim 9, wherein two half bridges are implemented using a multi-level configuration, in which the switches are connected to a capacitor C, where the voltage across said capacitor is half of the voltage.

15. The circuitry according to claim 9, wherein whenever there is a need for high power, using interleaved configuration by connecting several units in parallel and operate said units in an interleaved configuration.

16. The circuitry according to claim 9, wherein the polarity switch and the controlled current source are implemented using a half-bridge or a full bridge.

\* \* \* \* \*